(12) United States Patent
Benz et al.

(10) Patent No.: US 7,088,697 B1
(45) Date of Patent: Aug. 8, 2006

(54) METHODS AND APPARATUS FOR TRANSMITTING DATA IN A RADIO COMMUNICATION SYSTEM INCLUDING SIGNALING ALLOCATION OF A COMMON CHANNEL

(75) Inventors: Michael Benz, Feldkirchen (DE); Anja Klein, Berlin (DE); Reinhard Koehn, Berlin (DE); Volker Sommer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/857,884

(22) PCT Filed: Dec. 1, 1999

(86) PCT No.: PCT/DE99/03815

§ 371 (c)(1),
(2), (4) Date: Sep. 18, 2001

(87) PCT Pub. No.: WO00/35225

PCT Pub. Date: Jun. 15, 2000

(30) Foreign Application Priority Data

Dec. 9, 1998 (DE) ................................ 198 56 834

(51) Int. Cl.
*H04Q 7/20* (2006.01)
*H04B 7/216* (2006.01)

(52) U.S. Cl. ..................... 370/335; 370/441; 455/450

(58) Field of Classification Search ............... 370/329, 370/328, 335, 431, 441; 455/450
See application file for complete search history.

(56) References Cited

U.S. PATENT DOCUMENTS 5,859,840 A * 1/1999 Tiedemann et al. ......... 370/335

FOREIGN PATENT DOCUMENTS

| DE | 197 47 370 C1 | 11/1998 |
| DE | 198 55 194 A1 | 6/2000 |
| EP | 0 854 596 A1 | 7/1998 |
| EP | 1 006 692 A1 | 6/2000 |
| WO | WO 97/46044 | 12/1997 |

OTHER PUBLICATIONS

ETSI SMG2 UMTS-L1 Nov. 9-12, 1998.
WCDMA—The Radio Interface for Future Mobile Multimedia Communications—Dahlmann et al, pp. 1105-1118.
XP-000738581—An Intergrated Transmission Protocol for Broadband Mobile Multimedia Communication Systems, Wu et al, pp. 1346-1350.

* cited by examiner

*Primary Examiner*—Seema S. Rao
*Assistant Examiner*—Robert C. Scheibel, Jr.
(74) *Attorney, Agent, or Firm*—Bell, Boyd & Lloyd LLC

(57) ABSTRACT

According to the invention, signalling of the used common channels is carried out implicitly via the data rate. Several combinations of channels (spread codes) are only permitted as an alternative for particular data rates of the individual services. Transmission capacity is saved since it is not necessary to reserve individual bits inside the TFCI parameter uniquely for the allocation of said common channels to different connections. The invention is especially useful in the downlink of the FDD modus of UMTS mobile radio systems.

10 Claims, 4 Drawing Sheets

| TFCI | 0 | 1 | 2 | 3 |
|---|---|---|---|---|
| GR | 0 kbps | 16 kbps | 32 kbps | 48 kbps |
| DSCH_1 (16 kbps) | | x | x | x |
| DSCH_2 (16 kbps) | | | x | x |
| DSCH_3 (16 kbps) | | | | x |

| TFCI | 0 | 1 | 2 | 3 |
|---|---|---|---|---|
| GR | 0 kbps | 16 kbps | 32 kbps | 48 kbps |
| DSCH_1 (16 kbps) | | x | x | x |
| DSCH_2 (16 kbps) | | | x | x |
| DSCH_3 (16 kbps) | | | | x |

| TFCI | 0 | 1 | 2 | 3 |
|---|---|---|---|---|
| GR | 0 kbps | 16 kbps | 32 kbps | 48 kbps |
| DSCH_1 (16 kbps) | | | | x |
| DSCH_2 (16 kbps) | | | x | x |
| DSCH_3 (16 kbps) | | x | x | x |

Fig. 7

| V1 | Codes | V2 | Codes |
|---|---|---|---|
| 0 kbps | | 0 kbps | |
| 0 kbps | | 16 kbps | DSCH_3 |
| 0 kbps | | 32 kbps | DSCH_2 + DSCH_3 |
| 0 kbps | | 48 kbps | DSCH_1 + DSCH_2 + DSCH_3 |
| 16 kbps | DSCH_1 | 0 kbps | |
| 16 kbps | DSCH_1 | 16 kbps | DSCH_3 |
| 16 kbps | DSCH_1 | 32 kbps | DSCH_2 + DSCH_3 |
| 32 kbps | DSCH_1 + DSCH_2 | 0 kbps | |
| 32 kbps | DSCH_1 + DSCH_2 | 16 kbps | DSCH_3 |
| 48 kbps | DSCH_1 + DSCH_2 + DSCH_3 | 0 kbps | |

Fig. 8

| TFCI | S1 | S2 | S3 | DSCH configuration |
|---|---|---|---|---|
| 1 | 100 Bits | 0 | 140 Bits | DCH only |
| 2 | 200 Bits | 500 Bits | 1540 Bits | DCH + DSCH_1 |
| 3 | 200 Bits | 500 Bits | 1540 Bits | DCH + DSCH_2 |
| 4 | 200 Bits | 500 Bits | 1540 Bits | DCH + DSCH_3 + DSCH_4 |

METHODS AND APPARATUS FOR TRANSMITTING DATA IN A RADIO COMMUNICATION SYSTEM INCLUDING SIGNALING ALLOCATION OF A COMMON CHANNEL

BACKGROUND OF THE INVENTION

1. Field of the Invention

The present invention relates to a method for transmitting data in a radio communication system, particularly in mobile radio systems with a broadband radio interface, also called UMTS (universal mobile telecommunication system).

2. Description of the Prior Art

In radio communication systems, data are transmitted via a radio interface using electromagnetic waves. The radio interface refers to a connection between a base station and subscriber stations, with the subscriber stations being either mobile stations or stationary radio stations. In this context, the electromagnetic waves are radiated at carrier frequencies situated in the frequency band provided for the respective system. For future radio communication systems, for example the UMTS mobile radio system or other 3rd generation systems, frequencies in the frequency band of approximately 2000 MHz are provided, with the bandwidth of a channel being 5 MHz.

By contrast, with systems like GSM (global system for mobile communications), a number of services which also can be transmitted in parallel is provided for the UMTS mobile radio system. Patent specifications EP 98 122 719 and DE 198 55 194 describe options for signaling the transport formats for the combination of data for a number of services. The data for a number of services on a connection are transmitted via a jointly used physical channel in this case.

The use of jointly used physical channels for transmitting data for a number of services on a connection to a subscriber station presupposes that a unique mapping specification indicates the allocation of the services to different segments of the physical channel.

By way of example, a physical channel is defined by a frequency band and a spread code (CDMA code division multiple access) within a frame.

The following terms are customary for describing the mapping specification:

Transport Format (TF):

A transport format defines a data rate, a coding, scrambling (interleaving), a data rate adjustment by puncturing and an error protection specification for a transport channel for a service.

Transport Format Set (TFS):

This denotes a set of possible transport formats which are permitted for a specific service.

Transport Format Combination (TFC):

This term indicates a possible combination of transport formats for the various services which are mapped onto a common physical channel.

Transport Format Combination Set (TFCS):

This denotes a set of possible TFCs as a subset of all TFCs which are permitted for a specific connection.

Transport Format Combination Identifier (TFCI):

This information item indicates the currently used combination of transport formats within the TFC.

In order to be able to select the currently used combination of transport formats for the various services in line with requirements, the TFC needs to be able to be changed, and hence the TFCI needs to be signaled regularly. This signaling ties up transmission capacity, however. The greater the number of possible combination options (TFCS), the more capacity is required for signaling.

In the case of the broadband CDMA system chosen for the FDD mode (FDD frequency division duplex) for the UMTS mobile radio system, when transmitting from the base station to the subscriber station in the downlink direction, the problem arises that the number of orthogonal spread codes which are useful is limited, which makes it more difficult to support variable data rates. Thus, with relatively high traffic densities in the system, it is not possible to allocate to all subscriber stations as many dedicated (i.e., used exclusively by the subscriber station) channels (DCH) as they need for transmission at their respective highest data rate.

For this reason, common channels, "shared channels" (DSCH downlink shared channel), are defined in the downlink direction, in this regard cf. ETSI, SMG2, UMTS-L1, Tdoc SMG2 UMTS-L1 559/98, dated Nov. 9, 1998. The common channels are formed within the broadband frequency band by spread codes which are temporarily allocated to various connections or subscriber stations for the duration of one or more frames in each case. In this context, however, the problem arises of how it is possible to signal to a subscriber station with minimum complexity whether information is being transmitted for the subscriber station and, if so, in which of these common channels.

In addition, ETSI SMG2 UMTS-L1, Tdoc SMG2 UMTS-L1 559/98, dated Nov. 9, 1998, discloses that the data rates for the services transmitted using time-division multiplex are signaled using the TFCI parameter, which is transmitted during each frame as part of the control information; i.e., in-band. To ensure rapid allocation of common channels, explicit signaling is proposed which uses a particular number of these TFCI bits exclusively for the purpose of indicating a particular spread code (cf. penultimate page).

This solution has the drawback that, as a result of this, for a given number of TFCI bits, the number of combination options for transport formats for the services is significantly limited, which has a considerable effect on flexibility when transmitting variable data rates.

The present invention is, therefore, directed to a method and a radio communication system which, when using common channels for a number of connections, increase the flexibility of resource allocation when transmitting variable data rates.

SUMMARY OF THE INVENTION

Accordingly, the present invention is based on the idea of implicitly signaling the used common channels using the data rate, and of permitting a number of combinations of channels (spread codes) as alternatives only for particular data rates for the individual services. This saves transmission capacity, because there is no need to reserve any individual bits within the TFCI parameter just for allocating the common channels to different connections. The data rate is signaled in-band, with this information relating to the data rate not needing to be contained in full in each frame. Information from the connection context or from preceding frames likewise can be used for determining the data rate.

In accordance with one embodiment of the present invention, mapping the same combination of transport formats for the services onto various channels using the TFCI allows a very high degree of flexibility and can be achieved for minimum signaling complexity.

The relationship between allocated data rate and common channels to be used is agreed in a separate signaling channel, so that the receiver is able to derive the chosen combination of channels, including one or more common channels, from the respective value of the TFCI parameter. This signaling of the relationship (mapping specification for the TFCI values onto stipulated combinations of the transport formats) advantageously occurs upon connection setup between base station and subscriber station. The data rate for the TFCI in-band signaling is high and uses considerable transmission resources. If it is possible to make savings here by virtue of generally valid agreements at the start of connection, then the number of TFCI bits required can be reduced, or the number of combination options can be increased.

The method according to the present invention and its advantageous developments give rise to the following advantages:

- With purely implicit signaling, there is no additional signaling complexity, wherein the available TFCI bits can be used exclusively for signaling the combination of data rates for the individual services with very fine granularity.
- Implicit signaling permits a high maximum transmission capacity to be allocated for each connection. The resultant dependencies of the possible data rates between the connections become less significant the more connections are involved and common channels are available.
- The additionally possible allocation of the same service combinations to various common channels using a respective unique TFCI value permits a very high degree of flexibility to be achieved.
- The complexity for signaling common channels can be matched very precisely to the requirements of the connection and need not involve whole bits.
- The use of common channels can be limited to particular, higher-rate service combinations or those with high data rate dynamics, while low-rate service combinations are transmitted exclusively using dedicated channels.
- It is possible to allocate common channels on a connection-oriented basis and dynamically, depending on the current number of used channels.

Additional features and advantages of the present invention are described in, and will be apparent from, the following Detailed Description of the Preferred Embodiments and the Drawings.

DESCRIPTION OF THE DRAWINGS

FIGS. 7, 8 show ambiguous allocations and, hence, reduction in the likelihood of blockages.

DETAILED DESCRIPTION OF THE PREFERRED EMBODIMENTS

Figure 1:
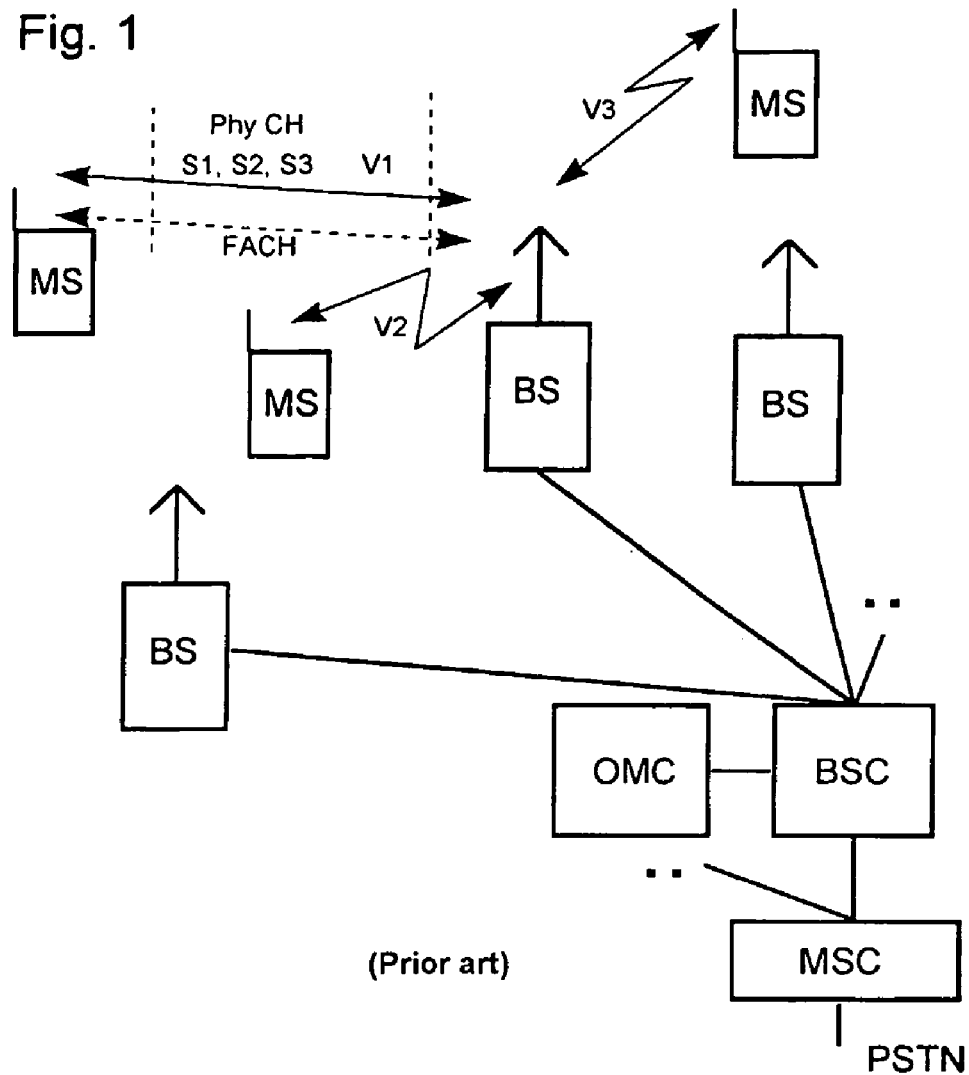
FIG. 1 shows a schematic illustration of a radio communication system.

The mobile radio system shown in FIG. 1 as an example of a radio communication system comprises a multiplicity of mobile switching centers MSC (although only one Mobile Switching Center is shown in FIG. 1 for illustrative purposes) which are interlinked and set up access to a landline network PSTN. In addition, these mobile switching centers MSC are connected to at least one respective device Radio network manager RNM (which is also known in the art as a Base Station Control, as indicated in FIG. 1), for controlling the transmission resources. Each of these devices RNM permits, in turn, a connection to at least one base station BS.

A base station BS can set up a connection to subscriber stations, e.g. mobile stations MS or other mobile and stationary terminals, via a radio interface. Each base station BS forms at least one radio cell. FIG. 1 shows connections for transmitting user information between a base station BS and mobile stations MS. Within a connection VI, data for, by way of example, three services S (S1, S2, S3) are transmitted within one or more physical channels Phy CH, and signaling information, e.g. the allocated radio system resources for a connection V1, is transmitted via a monitoring channel FACH (Forward link Access CHannel) which accompanies the connection.

An operation and maintenance center OMC provides monitoring and maintenance functions for the mobile radio system or for parts thereof. The functional scope of this structure can be transferred to other radio communication systems in which the present invention can be used, in particular for subscriber access networks with wireless subscriber access.

In the radio communication system shown in FIG. 1, both the base stations BS and the mobile stations MS are provided with both transmission and signaling devices which communicate with one another. The transmission device is used for transmitting data for a combination of a number of services S via the currently available physical channels Phy CH. The physical channels Phy CH may be in the form of dedicated channels DCH, i.e. used exclusively by one connection, or in the form of common channels DSCH, i.e. used alternately by different connections V1, V2. A distinction, therefore, needs to be drawn between physical channels Phy CH jointly used by a number of services S1, S2, S3 on a connection V1 and common channels DSCH, which are allocated to a number of connections V1, V2 but is allocated to just one of the connections V1 or V2 for use during a period of time. The allocation of a common channel DSCH can be changed very rapidly from frame to frame without additional signaling complexity. The use of a common channel DSCH by different connections at successive times permits, in particular, good correspondence to the high data rate and high dynamics of the data rate of some connections V1, V2.

The signaling device determines TFCI values for the selected combinations of transport formats TF for the services S1, S2, S3 and performs in-band signaling of the transport formats TF. In the separate channel FACH, the mapping specification for TFCI value to combination of transport formats TF and used channels DCH, DSCH is signaled.

Figure 2:
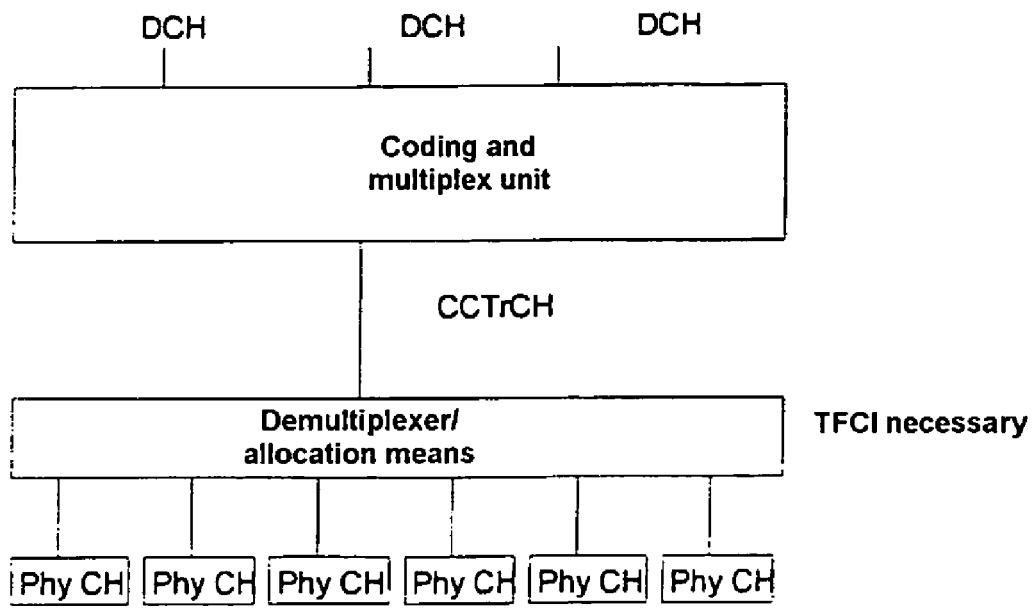
FIG. 2 shows a layer model of the transmission protocols.

The layer model shown in FIG. 2 shows the protocols of the radio communication system divided into three layers.

Layer 1: physical layer for describing all the functions for bit transmission via a physical medium (e.g., coding, modulation, transmission power monitoring, synchronization etc.).

Layer 2: data link layer for describing the mapping of data onto the physical layer, and monitoring thereof.

Layer 3: network layer for controlling the resources of the radio interface.

Layer 3 stipulates the TFCS for a connection, while layer 2 selects a combination (of a TFC) which is signaled in-band using a TFCI, as shown later.

The parameter exchange between layers 1 and 2 supports the functions of transferring frames with data for layer 2 via the radio interface and of displaying the status of layer 1 to higher layers. The parameter exchange between layers 1 and 3 supports monitoring of the configuration of the transmission in layer 1 and generates system information relating to layer 1.

In this case, the mapping of the data for various connections S onto a common physical channel Phy CH and the signaling of the allocation of a common channel DSCH correspond to the interaction of layers 1 and 2.

Figure 3:
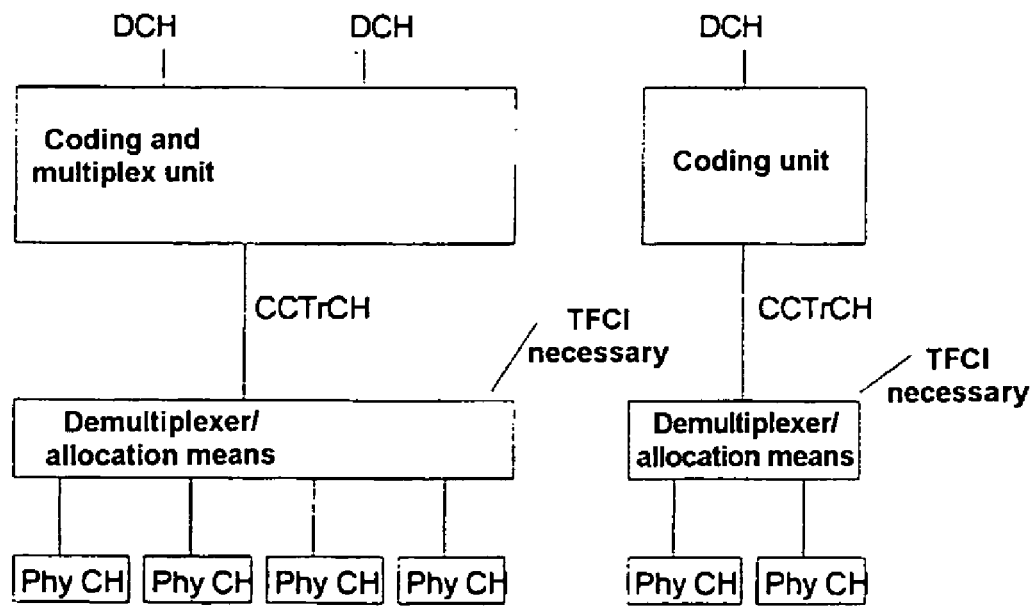
FIGS. 3, 4 show data for various services mapped onto jointly used physical channels.
Figures 4, 5, 6:
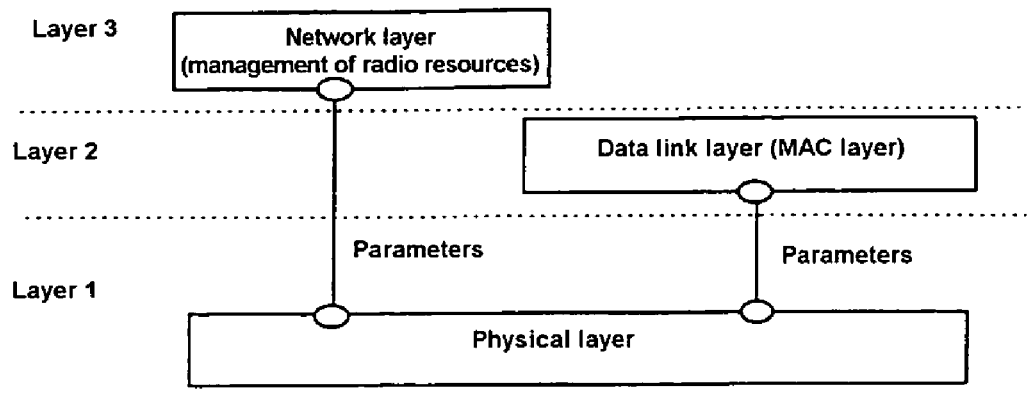
FIGS. 5, 6 show tables containing allocation options for common channels for a number of connections.

FIGS. 3 and 4 show the need for transport formats TF to be signaled for currently transmitted services.

FIG. 3 shows, as an illustration of function, a coding and multiplex unit which maps data from a number of data channels DCH (which each correspond to the data for a service S1, S2, S3) onto a coded common transport channel CCTrCH. In this context, mapping is a specification governing the bit pattern which is to be used for entering the data into a serial data sequence. A demultiplexer/allocation device distributes the data for the coded common transport channel CCTrCH over a number of physical channels Phy CH. The physical channels Phy CH are, thus, constantly used to transmit data for a number of services S1, S2, S3 in each case. A physical channel Phy CH is not allocated to one service S1 or S2 or S3 alone, but rather is allocated to the coded common transport channel CCTrCH with all its services S1, S2, S3.

Since the reception end needs to reconstruct this mapping and needs to read the data from the physical channels Phy CH and present them again in separate transport channels DCH for the services, signaling is necessary. This signaling in the form of TFCI values depicts the currently used combination of the transport formats TF for the services and, as shown later, the current allocation of a common channel or of a number of common channels DSCH. It has been agreed at connection setup which combinations are permitted for the connection (TFCS).

Two options in the relationship between data rate and service combinations can be implemented (cf. also EP 98 122 719):

1. Each data rate GR corresponds to precisely one combination of transport formats TF.
2. For each data rate GR, a number of combinations of transport formats TF are possible which can be distinguished using TFCI values.

FIG. 4 shows the mapping in a slightly modified form, with it becoming clear that the partial information item TFCI need be signaled only when physical channels Phy CH are jointly used by a number of services S1, S2, S3. If a service S1 or S2 or S3 uses one physical channel Phy CH exclusively, then signaling of the partial information item TFCI can be dispensed with.

The allocation of a common channel DSCH to a connection V is shown with reference to FIGS. 5 and 6 using an example having two mobile stations MS and, hence, two connections V1, V2. Let it be assumed that the connections 1 and 2 each can transmit their data using the data rates of 16, 32 and 48 kbps, with three common channels DSCH each having 16 kbps being available for both connections V1, V2. For the two connections V1, V2, the tables shown in FIGS. 5 and 6 each stipulate which of these common channels DSCH can be used to transmit which data rates. This table has been stipulated at the start of connection, but also may be changed concurrently with the connection.

Since the two connections V1, V2 exist in parallel, only particular combinations of the data rates are permitted, in order to prevent simultaneous use of the common channels DSCH. These are indicated in the table shown in FIG. 7.

In this example, only 10 of 16 possible combinations are permitted. All the combinations in which more than 16 kbps are transmitted simultaneously for the two connections V1, V2 must be excluded. In general, the described implicit allocation of common channels DSCH allows the available channels to be split over all the connections V1, V2 with such flexibility that each individual connection V1, V2 is able to use a much higher transmission capacity than in the case of fixed allocation of the channels as dedicated channels DCH.

In this case, for statistical reasons, the limitation to particular combinations becomes less significant the more connections V1, V2 and common channels DSCH are available. This assumes that the ratio of the maximum data rate required by all connections V1, V2 to the data rate which is possible as a result of the use of all common channels DSCH remains constant.

An additional degree of freedom is possible if not every data rate has a fixed mapping, i.e. uniquely onto prescribed TFCI values, but instead alternatives can be chosen. For the purposes of illustration, FIG. 8 shows, for a connection V1, the incorporation of the configuration of the common channels DSCH into the information signaled by the TFCI values.

A TFCI value represents a particular configuration of the services S1 to S3. To date, only one TFCI value for each permitted combination was appropriate. The extension by the configuration data for the common channels DSCH can now be used to allocate a particular service combination to different combinations of dedicated and common channels DCH, DSCH. In FIG. 8, the TFCI values 2, 3 and 4 relate to the same service combination, but different allocated common channels DSCH are signaled.

If this table is allocated to a number of connections V1, V2, various common channels DSCH can be chosen as alternatives by selecting a suitable TFCI value 2, 3 or 4, in order to permit a high data rate for up to three connections V simultaneously. By contrast, the low total data rate in the second row can always be transmitted in the permanently allocated dedicated channel DCH. For this reason, no common channel DSCH is necessary.

Figure 9:
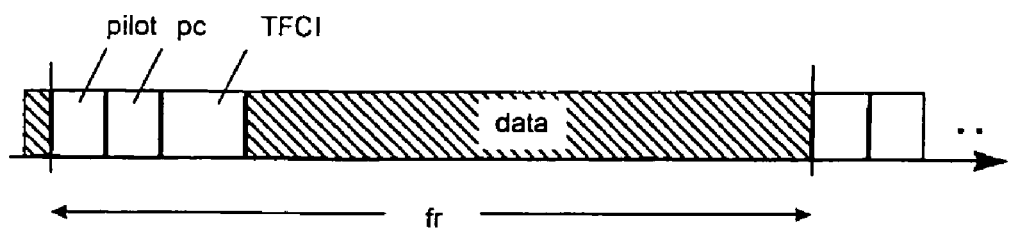
FIG. 9 shows data transmission in frames with in-band signaling.

The in-band signaling of the TFCI values is effected as shown in FIG. 9. Within frame-by-frame transmission of data together with other information, capacity is also provided for transmitting the currently chosen combination of the transport formats TF and allocation of the common channels DSCH in the form of the TFCI values. In the FDD mode of UMTS, a frame lasts 10 ms, with bits of a pilot sequence serving for channel estimation, bits being required for transmission power regulation and bits being reserved for in-band signaling of the TFCI. Next comes a data component with user information. Error protection coding of the TFCI on, by way of example, 32 bits and scrambling of the user information over a number of frames are not shown in FIG. 9.

Although the present invention has been described with reference to specific embodiments, those of skill in the art will recognize that changes may be made thereto without departing from the spirit and scope of the invention as set forth in the hereafter appended claims.

We claim as our invention:

1. A method for transmitting data over a radio interface between a base station and a plurality of subscriber stations in a radio communication system, the method comprising the steps of:
    distinguishing channels in a broadband frequency band using individual spread codes, wherein at least one common channel is allocated to a plurality of connections existing in parallel for use at successive times;
    signaling in-band a subsequently valid allocation of the at least one common channel for one of the plurality of connections in at least one of the channels of the data transmission using a respective TFCI value that specifies (1) combinations of data for a plurality of services to be transmitted within the at least one of the channels, (2) a data rate and (3) at least one of the individual spread codes contained in the data rate allocated to the connection;
    agreeing upon a relationship among (1) the TFCI value and the combinations of data for a plurality of services to be transmitted within the at least one of the channels, (2) the data rate, (3) the at least one of the individual spread codes contained in the allocated data rate and (4) the at least one common channel to be used in a separate signaling channel; and
    transmitting the data in the at least one of the channels for data transmission based on the allocation.

2. A method for transmitting data over a radio interface between a base station and a plurality of subscriber stations in a radio communication system as claimed in claim 1, wherein the transmission of data occurs in a downlink direction from the base station to the plurality of subscriber stations.

3. A method for transmitting data over a radio interface between a base station and a plurality of subscriber stations in a radio communication system as claimed in claim 2, wherein a largest possible number of channels are allocated as the common channels, with at least one channel per connection being allocated exclusively.

4. A method for transmitting data over a radio interface between a base station and a plurality of subscriber stations in a radio communication system as claimed in claim 3, wherein the common channels are allocated for connections having a high maximum data rate.

5. A method for transmitting data over a radio interface between a base station and a plurality of subscriber stations in a radio communication system as claimed in claim 3, wherein the common channels are allocated for connections having high data rate dynamics.

6. A method for transmitting data over a radio interface between a base station and a plurality of subscriber stations in a radio communication system as claimed in claim 1, wherein, for a subset of the data rates, the in-band signaling can be used to select from a plurality of combinations of channels for a connection.

7. A method for transmitting data over a radio interface between a base station and a plurality of subscriber stations in a radio communication system as claimed in claim 1, wherein a relationship between the allocated data rate and the common channels to be used is agreed upon at connection setup.

8. A method for transmitting data over a radio interface between a base station and a plurality of subscriber stations in a radio communication system as claimed in claim 1, wherein a partial information item is used to signal in-band the individual data rates for the services within a connection and the use of one or more channels.

9. A radio communication system for transmitting data over a radio interface between a base station and a plurality of subscriber stations, comprising:
    a plurality of channels forming the radio interface in a broadband frequency band, the plurality of channels being distinguished using individual spread codes, and at least one common channel being allocated to a plurality of connections existing in parallel for use at successive times;
    a transmitter for transmitting a combination of data for a plurality of services on a connection within at least one channel for data transmission between the base station and the plurality of subscriber stations; and
    a signaling device for determining and signaling a subsequently valid allocation of the common channel for a connection using a respective TFCI value that specifies (1) combinations of data for a plurality of services to be transmitted within the at least one of the channels, (2) a data rate and (3) at least one of the individual spread codes, contained in the data rate, which is allocated to the connection, via in-band signaling in at least one channel of the data transmission, wherein a relationship among (1) the TFCI values that specify combinations of data for a plurality of services to be transmitted within the at least one of the channels, (2) the data rate and (3) the at least one of the individual spread codes contained in the allocated data rate, and wherein the allocated common channel is transmitted in a separate signaling channel.

10. A method for transmitting data over a radio interface between a base station and a plurality of subscriber stations in a radio communication system, the method comprising the steps of:
    identifying individual spread codes in a plurality of channels on a broadband frequency band;
    distinguishing said channels in accordance with said identified spread codes, wherein at least one common channel is allocated to a plurality of connections existing in parallel for use at successive times;
    signaling in-band an allocation of the at least one common channel for one of the plurality of connections in at least one of the channels of the data transmission using a respective TFCI value that specifies (1) combinations of data for a plurality of services to be transmitted within the at least one of the channels, (2) a data rate and (3) at least one of the individual spread codes contained in the data rate allocated to the connection;
    agreeing upon a relationship among (1) the TFCI value and the combinations of data for a plurality of services to be transmitted within the at least one of the channels, (2) the data rate, (3) the at least one of the individual spread codes contained in the allocated data rate, wherein the at least one common channel to be used is set in a separate signaling channel; and
    transmitting the data in the at least one of the channels for data transmission based on the allocation.

* * * * *